United States Patent
Wang et al.

(10) Patent No.: US 11,592,124 B2
(45) Date of Patent: Feb. 28, 2023

(54) CARBON STEEL-CONCRETE/CEMENT MORTAR-STAINLESS STEEL COMPOSITE SUBMARINE PIPELINE

(71) Applicant: Tsinghua University, Beijing (CN)

(72) Inventors: Facheng Wang, Beijing (CN); Qing Yu, Beijing (CN); Huayang Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 220 days.

(21) Appl. No.: 17/257,174

(22) PCT Filed: Nov. 1, 2018

(86) PCT No.: PCT/CN2018/113507
§ 371 (c)(1),
(2) Date: Dec. 30, 2020

(87) PCT Pub. No.: WO2020/006947
PCT Pub. Date: Jan. 9, 2020

(65) Prior Publication Data
US 2021/0180726 A1    Jun. 17, 2021

(30) Foreign Application Priority Data
Jul. 2, 2018  (CN) .......................... 201810705266.4

(51) Int. Cl.
*F16L 9/153* (2006.01)
*B32B 1/08* (2006.01)
*B32B 13/06* (2006.01)

(52) U.S. Cl.
CPC ................ *F16L 9/153* (2013.01); *B32B 1/08* (2013.01); *B32B 13/06* (2013.01); *B32B 2250/03* (2013.01); *B32B 2597/00* (2013.01)

(58) Field of Classification Search
CPC . F16L 9/153; B32B 1/08; B32B 13/06; B32B 2250/03; B32B 2597/00
(Continued)

(56) References Cited

U.S. PATENT DOCUMENTS 153,298 A * 7/1874 Ball ...................... F16L 58/182
285/55
1,951,512 A * 3/1934 Jewell ..................... F16L 13/11
403/336
(Continued)

FOREIGN PATENT DOCUMENTS

CN    204942783    1/2016
CN    206170776    5/2017

OTHER PUBLICATIONS

WIPO, ISR for PCT/CN2018/113507, Mar. 22, 2019.

*Primary Examiner* — Craig M Schneider
*Assistant Examiner* — David R Deal
(74) *Attorney, Agent, or Firm* — Hodgson Russ LLP

(57) ABSTRACT

A carbon steel-concrete/cement mortar-stainless steel composite submarine pipeline belongs to the technical field of marine structure engineering. The composite submarine pipeline is formed by connecting several composite sub-pipelines arranged sequentially along an axial direction of the pipeline, each composite sub-pipeline has an identical structure and includes an outer carbon steel pipe and an inner stainless steel pipe each having a circular cross section and concentrically placed, concrete or cement mortar is filled between the outer carbon steel pipe and the inner stainless steel pipe to form a sandwiched structure with a circular ring-shaped cross section. Between two adjacent composite sub-pipelines, the welding line of the inner stainless steel pipelines is covered by the concrete/cement mortar, and the (Continued)

fatigue performance of the inner stainless steel pipes at the welding line can be improved effectively.

10 Claims, 1 Drawing Sheet

(58) Field of Classification Search
USPC .......................................................... 138/143
See application file for complete search history.

(56) References Cited

U.S. PATENT DOCUMENTS

| | | | | | |
|---|---|---|---|---|---|
| 3,860,039 | A | * | 1/1975 | Ells | F16L 57/02 |
| | | | | | 138/140 |
| 4,014,369 | A | * | 3/1977 | Kobres, Jr. | F16L 59/06 |
| | | | | | 138/112 |
| 4,241,762 | A | * | 12/1980 | Link | E21D 5/11 |
| | | | | | 405/133 |
| 4,348,243 | A | * | 9/1982 | Craubner | C08K 7/28 |
| | | | | | 428/34.7 |
| 4,395,159 | A | * | 7/1983 | Karuks | F16L 58/06 |
| | | | | | 427/403 |
| 4,437,495 | A | * | 3/1984 | Zonsveld | B28B 19/0038 |
| | | | | | 138/146 |
| 4,606,378 | A | * | 8/1986 | Meyer | F16L 1/24 |
| | | | | | 138/145 |
| 7,673,432 | B2 | * | 3/2010 | Teng | E04C 3/29 |
| | | | | | 138/146 |
| 9,970,504 | B2 | * | 5/2018 | Shah | F16F 9/0454 |
| 2005/0236061 | A1 | * | 10/2005 | Estefen | F16L 9/147 |
| | | | | | 138/143 |
| 2009/0000681 | A1 | * | 1/2009 | Averbuch | F16L 59/14 |
| | | | | | 29/890.036 |

* cited by examiner

CARBON STEEL-CONCRETE/CEMENT MORTAR-STAINLESS STEEL COMPOSITE SUBMARINE PIPELINE

CROSS-REFERENCE TO RELATED APPLICATION

The present application is a national phase entry under 35 USC § 371 of International Application PCT/CN2018/113507, filed Nov. 1, 2018, which claims the benefit of and priority to Chinese Patent Application No. 201810705266.4, filed Jul. 2, 2018, the entire disclosures of which are hereby incorporated by reference.

FIELD

The present disclosure relates to a field of marine structure engineering technologies, and more particularly to a carbon steel-concrete/cement mortar-stainless steel composite submarine pipeline.

BACKGROUND

The submarine pipeline is an important structural component for offshore oil and gas development, which can protect transmission medium inside the pipeline from influence of the complex environment outside and inside the pipeline by strength and corrosion resistance of materials, guaranteeing uninterrupted transmission of oil, gas, or other resources, and thus undertake most of important tasks of oil and gas field transportation. However, in the course of service, structural damage and material aging of the submarine pipeline can occur due to the effect of the internal or external and human or natural factors. The accumulation of these damages may lead to rupture, breakage, corrosion, leakage or other accidents of submarine pipelines. In recent years, accidents, such as the corrosion and leakage of the pipeline caused by the change of corrosive composition of carbon dioxide ($CO_2$) or hydrogen sulfide ($H_2S$) in oil and gas medium and the structural damage of pipeline caused by anchor falls due to marine activities, are becoming more and more frequent. Submarine pipeline technology has undergone considerable development, but the structural form of the submarine pipeline is difficult to satisfy the requirements of the mechanical properties and corrosion resistance, and the accidents are increasing. For example, traditional single-layer and double-layer submarine pipelines are difficult to satisfy the requirement of the corrosion resistance by means of designing corrosion allowance when transporting the oil and gas medium containing a certain carbon dioxide ($CO_2$) or hydrogen sulfide ($H_2S$) composition. For a bimetal composite pipe, the structural corrosion resistance can be improved by an inner stainless steel pipe. However, when calculating the mechanical properties of the whole pipeline, the inner stainless steel pipe and outer concrete are generally not considered, because they are connected to a carbon steel pipe by mechanical laminating and external bonding separately, making the bimetal composite pipe difficult to satisfy the requirement of the mechanical properties under the harsh environment.

SUMMARY

A carbon steel-concrete/cement mortar-stainless steel composite submarine pipeline proposed by the present disclosure is formed by connecting several composite sub-pipelines arranged sequentially along an axial direction of the pipeline. Each composite sub-pipeline has an identical structure and includes an outer carbon steel pipe and an inner stainless steel pipe, the outer carbon steel pipe and the inner stainless steel pipe each have a circular cross section and are concentrically placed, and concrete or cement mortar is filled between the outer carbon steel pipe and the inner stainless steel pipe to form a sandwiched structure with a circular ring-shaped cross section.

DETAILED DESCRIPTION

The present disclosure is further illustrated in detail in combination with the accompanying drawings and the embodiments hereinafter.

Figure 1:
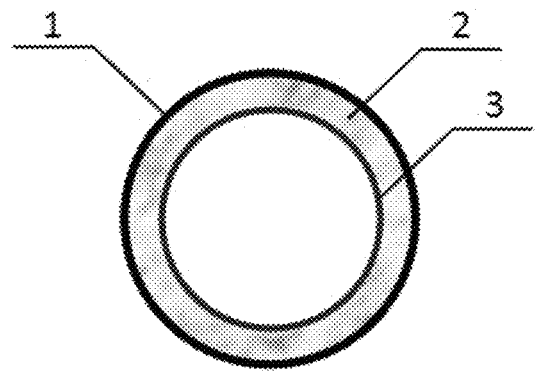
FIG. 1 is a schematic view of a cross section of a composite sub-pipeline according to embodiments of the present disclosure.

A carbon steel-concrete/cement mortar-stainless steel composite submarine pipeline according to embodiments of the present disclosure is formed by connecting several composite sub-pipelines arranged sequentially along an axial direction of the pipeline. Each composite sub-pipeline has an identical structure (a cross section thereof is referenced in FIG. 1), and includes an outer carbon steel pipe 1 and an inner stainless steel pipe 3 which each have a circular cross section and are concentrically placed. Concrete or cement mortar is filled between the outer carbon steel pipe 1 and the inner stainless steel pipe 3 to form a sandwiched structure 2 with a circular ring-shaped cross section.

The diameter of the outer carbon steel pipe 1 is between 6 and 60 inches, the ratio of the diameter to the wall thickness is less than or equal to 45, the minimum value of the ratio of the diameter to the wall thickness is determined by economy and product process and is generally greater than 15. A ratio value of the diameter of the outer carbon steel pipe 1 to the diameter of the inner stainless steel pipe 3 is 0.25-0.75. When the filler is concrete or cement mortar, a thickness of the sandwiched structure 2 is greater than or equal to 30 mm, the maximum value of the thickness of the sandwiched structure 2 satisfies the range of the ratio value of the diameter of the outer carbon steel pipe 1 to the diameter of the inner stainless steel pipe 3. When the concrete is filled into the sandwiched structure 2, it is generally required that the thickness of the sandwiched structure 2 is greater than or equal to three times of aggregate size in the concrete. A wall thickness of the inner stainless steel pipe 3 is not less than 2 mm. A ratio value $D_o/t_o$ of the diameter $D_o$ of the outer carbon steel pipe 1 to the wall thickness to thereof is less than the ratio value $D_i/t_i$ of the diameter $D_i$ of the inner stainless steel pipe 3 to the wall thickness $t_i$ thereof to ensure the outer carbon steel pipe to reach its ultimate axial bearing capacity before the inner stainless steel pipe under the ultimate axial compression load.

Figure 2:
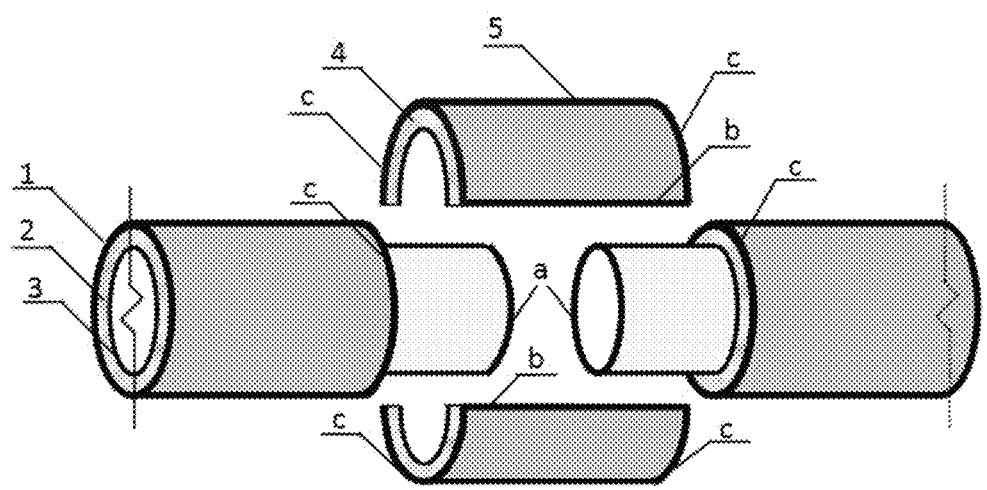
FIG. 2 is a schematic view of a connection of two adjacent composite sub-pipelines according to embodiments of the present disclosure.

Further, a connection mode between two adjacent composite sub-pipelines according to the embodiments of the present disclosure is shown in FIG. 2. The axial lengths of the inner stainless steel pipes 3 of two composite sub-pipelines at a junction are each beyond the outer carbon steel pipe 1 and the sandwiched structure 2 by about 200-400 mm (determined according to the specific project, the present embodiment is 250 mm), and two inner stainless steel pipes are aligned and then welded in a circumferential direction a. Two connecting structures having a length of approximately 400-800 mm (determined according to the specific project, the present embodiment is 500 mm) cover outer sides of two inner stainless steel pipes 3 at the junction respectively, two connecting structures are each integrally formed by an inner concrete or cement mortar semi-circular ring 4 and an outer carbon steel semi-circular ring 5 placed concentrically (the size of such outer carbon steel semi-circular ring is equal to the size of the outer carbon steel pipes at two sides), and an inner side of the inner concrete or cement mortar semi-circular ring 4 contacts the outer side of the inner stainless steel pipe 3 at the junction tightly. Two outer carbon steel semi-circular rings 5 are aligned and then welded in an axial direction b, finally the two welded outer carbon steel semi-circular rings 5 and the outer carbon steel pipes 1 of the composite sub-pipelines at both sides are aligned and then welded in a circumferential direction c.

The various components according to the embodiments of the present disclosure are obtained by conventional preparation process using commercially available materials, in which, the concrete employs any one of normal concrete, light-weight aggregate concrete or recycled concrete.

The above description are only preferred embodiments of the present disclosure and are not to limit the protection scope of the present disclosure, any modification, equivalent replacement, and improvement made within the spirit and principle of the present disclosure fall within the protection scope of the present disclosure.

What is claimed is:

1. A carbon steel-concrete/cement mortar-stainless steel composite submarine pipeline, formed by connecting several composite sub-pipelines arranged sequentially along an axial direction of the pipeline, wherein each composite sub-pipeline has an identical structure and comprises an outer carbon steel pipe and an inner stainless steel pipe, the outer carbon steel pipe and the inner stainless steel pipe each have a circular cross section and are concentrically placed, and concrete or cement mortar is filled between the outer carbon steel pipe and the inner stainless steel pipe to form a sandwiched structure with a circular ring-shaped cross section, wherein two adjacent composite sub-pipelines are connected in following mode: axial lengths of inner stainless steel pipes of the two composite sub-pipelines at a junction are each beyond the outer carbon steel pipe and the sandwiched structure by a first length, the two inner stainless steel pipes are aligned and welded in a circumferential direction; two connecting structures having a length of twice the first length cover outer sides of the two inner stainless steel pipes at the junction respectively, each connecting structure is integrally formed by an inner concrete or cement mortar semi-circular ring and an outer carbon steel semi-circular ring placed concentrically, and an inner side of the inner concrete or cement mortar semi-circular ring contacts the outer side of the inner stainless steel pipe at the junction; two outer carbon steel semi-circular rings are aligned and welded in an axial direction; and two welded outer carbon steel semi-circular rings and the outer carbon steel pipes of the composite sub-pipelines at two sides are aligned and welded in the circumferential direction.

2. The carbon steel-concrete/cement mortar-stainless steel composite submarine pipeline according to claim 1, wherein a value of the first length is 200-400 mm.

3. The carbon steel-concrete/cement mortar-stainless steel composite submarine pipeline according to claim 2, wherein the concrete employs any one of normal concrete, light-weight aggregate concrete or recycled concrete.

4. The carbon steel-concrete/cement mortar-stainless steel composite submarine pipeline according to claim 1, wherein the concrete employs any one of normal concrete, light-weight aggregate concrete or recycled concrete.

5. The carbon steel-concrete/cement mortar-stainless steel composite submarine pipeline according to claim 1, wherein the concrete employs any one of normal concrete, light-weight aggregate concrete or recycled concrete.

6. The carbon steel-concrete/cement mortar-stainless steel composite submarine pipeline according to claim 1, wherein a diameter of the outer carbon steel pipe is between 6 and 60 inches.

7. The carbon steel-concrete/cement mortar-stainless steel composite submarine pipeline according to claim 6, wherein a ratio of the diameter of the outer carbon steel pipe to a wall thickness thereof is greater than 15 and less than or equal to 45.

8. The carbon steel-concrete/cement mortar-stainless steel composite submarine pipeline according to claim 7, wherein a thickness of the sandwiched structure is greater than or equal to 30 mm.

9. The carbon steel-concrete/cement mortar-stainless steel composite submarine pipeline according to claim 1, wherein a ratio value of a diameter of the outer carbon steel pipe to a wall thickness to thereof is less than a ratio value of a diameter of the inner stainless steel pipe to a wall thickness thereof.

10. The carbon steel-concrete/cement mortar-stainless steel composite submarine pipeline according to claim 1, wherein a size of the outer carbon steel semi-circular ring is equal to a size of the outer carbon steel pipes at two sides.

* * * * *